United States Patent [19]
Grafwallner et al.

[11] Patent Number: 5,833,172
[45] Date of Patent: Nov. 10, 1998

[54] ARRANGEMENT OF OUTLET DEVICES

[75] Inventors: Franz Grafwallner, Hönenkirchen; Peter Luger, Höhenkirchen-Siegertsbrunn; Helmuth Peller, Höhenkirchen-Siegersbrunn; Martin Müller, Höhenkirchen-Siegertsbrunn, all of Germany; Valentin V. Malyshev, Moscow, Russian Federation; Sergei B. Galperin, Moscow, Russian Federation; Andrew E. Kovalev, Moscow, Russian Federation; Alexsander S. Shengardt, Moscow, Russian Federation

[73] Assignees: Daimler-Benz Aerospace AG, Ottobrunn, Germany; Tupolev AG, Moscow, Russian Federation

[21] Appl. No.: 749,736

[22] Filed: Nov. 15, 1996

[30] Foreign Application Priority Data

Nov. 18, 1995 [DE] Germany .......................... 195 43 163.4

[51] Int. Cl.$^6$ ........................... B64D 37/04; B64D 37/30; B64D 37/32
[52] U.S. Cl. ......................... 244/1 R; 244/135 R
[58] Field of Search ................. 244/1 R, 185 R, 244/136

[56] References Cited

U.S. PATENT DOCUMENTS 3,199,812  8/1965  Spoecker ............................ 244/135 R
3,243,150  3/1966  Woodcock .......................... 244/135 R
3,979,005  9/1976  Robinson et al. ................... 244/135 R
4,817,890  4/1989  Coffinberry ........................ 244/135 R
5,660,358  8/1997  Grafwallner et al. ............... 244/135 R

FOREIGN PATENT DOCUMENTS 3626978   2/1988  Germany ................................ 244/136
195 43 163  3/1997  Germany .

OTHER PUBLICATIONS

Tu–155 research aircraft article and two drawing figures. Date and Author unknown.

Primary Examiner—William Grant
Attorney, Agent, or Firm—McGlew and Tuttle

[57] ABSTRACT

An arrangement of outlet devices for releasing into the atmosphere cryogenic, combustible exhaust vapors in the near-surface, flow-swept, outer area of aircraft, land vehicles and watercraft. The arrangement provides at least one outlet device on the top side of a component at the top end of a pylon, which is favorable in terms of flow, in the free, undisturbed air flow. Each outlet device is arranged, designed and oriented such that the exhaust vapor is released in at least one directed jet oriented to the rear or to the rear and upward, with or without a lateral component, and is kept away from air inlets, hot exhaust gas jets and other sources of ignition, as well as from surfaces of components.

6 Claims, 1 Drawing Sheet

ARRANGEMENT OF OUTLET DEVICES

FIELD OF THE INVENTION

The present invention pertains to an arrangement of outlet devices for releasing into the atmosphere cryogenic, combustible exhaust vapors in the near-surface, flow-swept, outer area of aircraft, land vehicles and watercraft, especially of airplanes using cryogenic fuels.

BACKGROUND OF THE INVENTION

There has been increasing interest in operating a great variety of vehicles with cryogenic fuels, e.g., liquid hydrogen (LH$_2$), liquid natural gas (LNG), or liquid methane, especially for reasons of reducing the emissions. This is last but not least also the reason why there has been a need for transporting such materials over rather great distances in suitable vehicles, so that vehicles act both as users and as means of transportation or they have both functions at the same time. Heat-insulated tanks are carried in or on the vehicles in all these cases, and a certain, permanent introduction of heat into the contents of the tank can practically never be avoided. Considerable additional heat loads may occur in the case of damage to or destruction of the insulation of the tank. Furthermore, heat sources, which are necessary for function, e.g., pumps or circulating devices, are usually present in the tank. The increase in pressure caused by the introduction of heat must be controlled by releasing vapor at least when the load-bearing capacity limit of the tank structure is reached. Even though the further use of the high-energy exhaust vapor is desirable, it is often unfeasible, so that only a release into the atmosphere is thus ultimately possible.

Safe release of the exhaust vapor via correspondingly high stacks is expedient in the case of stationary tank facilities, and intentional burn-off may be meaningful or necessary.

Such designs are not acceptable in the case of vehicles traveling at higher speeds, in which aerodynamic effects are to be taken into account.

Tank ventilation systems which have been known for aircraft operated with kerosene cannot be applied to cryogenic applications, because the cryogenic fuels in question may cause damage to materials (embrittlement) as a consequence of their extremely low temperature and damage due to fire with sometimes catastrophic consequences after unintended ignition as a consequence of their usually high flammability.

The safety requirements (structural protection) specific of cryogenic materials are not sufficiently taken into account in the prior-art kerosene tank ventilation systems either in terms of their arrangement or in terms of their design.

Calculations and practical experiments have shown that exhaust vapor jets, whose length may reach up to and over 10 m at a diameter of up to 3 m, can be expected. A shooting flame of a comparable size with a temperature exceeding 2,000° C. is formed from such jets in the case of unintended ignition.

In an experimental airplane Tuppleu TU-155 (TU-155) already flying on LH$_2$, the fuel exhaust vapor is therefore released at the top end of the rudder unit. Depending on the site of installation of the tanks (e.g., on the wings) unfavorably long, heavy line configurations (connection between the tank and the outlet device), which are objectionable from the viewpoint of safety engineering, may thus be formed.

SUMMARY AND OBJECTS OF THE INVENTION

In light of the above-described problem, the object of the present invention is to provide designs and to show the person skilled in the art design rules for the arrangement of outlet devices for releasing cryogenic, combustible exhaust vapors in the near-surface, flow-swept outer area of aircraft, land vehicles and watercraft into the atmosphere, rules which, if followed, make it possible to avoid low-temperature damage to the vehicle structure with certainty, to extensively rule out an unintended ignition of the exhaust vapors, to eliminate appreciable damage due to fire even in the case of ignition of the exhaust vapors, and to install the outlet devices in the vicinity of the tanks, which leads to the advantages of having shorter, simpler, safer, and lighter connection lines.

According to the invention, an arrangement of outlet devices is provided for releasing into the atmosphere cryogenic, combustible exhaust vapors in the near-surface, flow-swept, outer area of a craft using cryogenic fuels. At least one outlet device is arranged on a top side of a component at the top end of a pylon which is favorable in terms of flow, in the free, undisturbed air flow, and this/these outlet device(s) or each outlet device is arranged, designed and oriented such that the exhaust vapor is released in at least one directed jet oriented to the rear or to the rear and upward, with or without a lateral direction component. This directed jet is kept away from air inlets, hot exhaust gas jets and other sources of ignition as well as from surfaces of components.

Each outlet device is to be arranged on the top side of a component at the top end of a pylon, which is favorable in terms of flow, in the free, undisturbed air flow. The "top arrangement" is especially important in the case of cryogenic hydrogen vapors, which have the property of rising immediately to the top in the ambient air due to their density. The release in undisturbed flow as well as the pylon design, which is favorable in terms of flow, prevent "flame retention effects," so that the exhaust vapors are removed from the outlet devices quickly and without disturbing swirling, which is of great significance especially in the case of unintended ignition.

The exhaust vapors are released in directed jets with the principal flow component directed against the direction of travel/flight, which also leads to a rapid removal from the vehicle. Lateral and upwardly directed flow components may be superimposed on one another. In the case of cryogenic exhaust vapors heavier than air and with non-moving vehicles, the exhaust vapors can be thus prevented from sinking in the area of the vehicle or in a hazardous proximity to the vehicle. The exhaust vapor jets are to be kept away from air inlets, hot exhaust gas jets and other sources of ignition as well as from surfaces of components because of the fire hazard, low-temperature damage, and interior air pollution within the vehicle.

The arrangement is preferably used on airplanes having a prior-art aerodynamic concept, i.e., those having a fuselage, wings, horizontal tail units and rudder units. The outlet device is preferably arranged on the top side of the rudder unit.

With such airplanes having a prior-art aerodynamic concept, the outlet device may advantageously be arranged on the top side of the front end of the fuselage and is designed such that the exhaust vapor released there is split into two jets flowing past the said rudder unit on both sides.

For such airplanes having a prior-art aerodynamic concept and slipper tanks under the wings laterally outside the engines arranged there the outlet device is arranged at a downstream end of each slipper tank on its top side and is oriented such that the exhaust vapor released there moves away from the hot engine exhaust gas jet in a jet flowing laterally to the outside.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
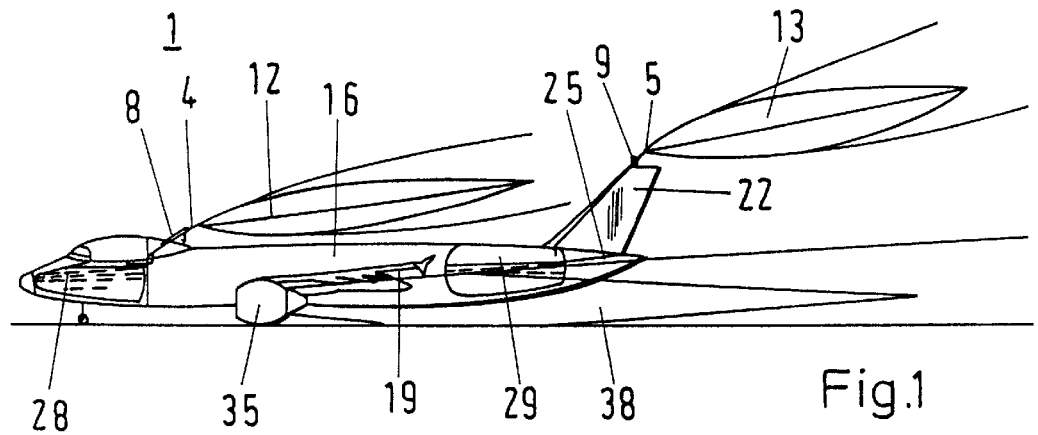
FIG. 1 is a side view of an airplane with two fuselage tanks and two associated outlet devices.
Figure 2:
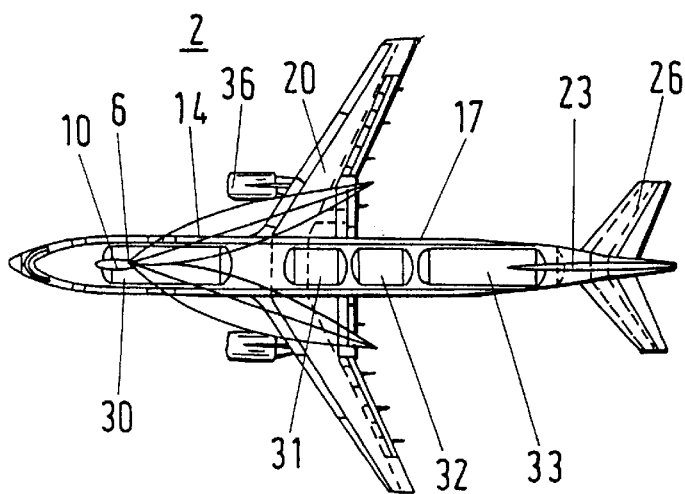
FIG. 2 is a top view of an airplane with four correspondingly clad tanks arranged at the top on the fuselage, with an outlet device.
Figure 3:
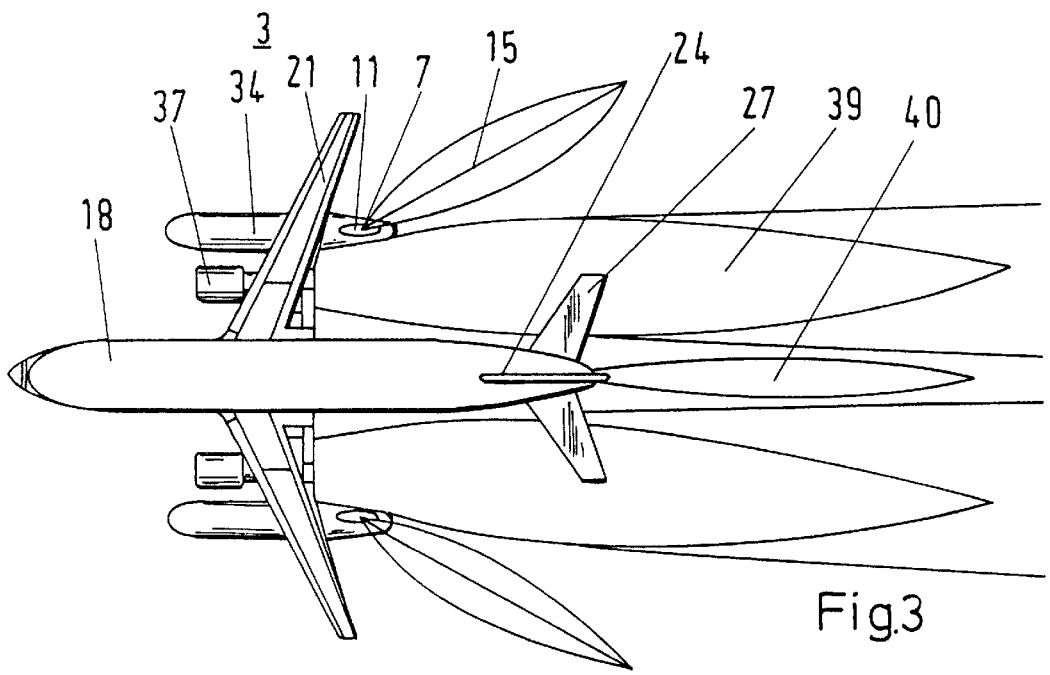
FIG. 3 is a top view of an airplane with two slipper tanks and two outlet devices arranged thereon.

Referring to the drawings in particular, the invention provides an arrangement of outlet devices 4, 5, 6 and 7 for an outer area of a craft using cryogenic fuels. The craft shown in FIGS. 1–3 is an airplane having a prior-art aerodynamic concept, i.e., having a fuselage, wings, horizontal tail units and rudder units. Other craft including other aircraft, land vehicles and watercraft can use the arrangement according to the invention.

The airplane 1 according to FIG. 1 has a known aerodynamic concept, i.e., each of a fuselage 16, wings 19 with an engine 35, as well as a tail stabilizer comprising a rudder unit 22 and a horizontal tail unit 25. One tank 28, 29 each for cryogenic fuel is accommodated in the fuselage 16 in the area of a front end and a rear end. The tank exhaust vapor lines—not specifically designated—lead upward through respective pylons 8 and 9, which are favorable in terms of flow, to respective outlet devices 4 and 5—as far away as possible—in the front on the fuselage 16 and on top of the rudder unit 22. The exhaust vapor jets 12, 13 discharged from the outlet devices 4, 5 from time to time are represented here as "lance-shaped" core zones and diverging mixing zones (with outside air).

The two engine exhaust gas jets 38 are also shown in the same manner. The distance between the outlet device 4 and the rudder unit 22 must be markedly greater than the maximum length of the area in which structural damage due to cold or heat (in the case of inflammation) is to be expected. If this is not possible, it is recommended that the front exhaust vapor jet be split into two partial jets flowing laterally past the rudder unit, as is shown in FIG. 2.

The airplane 2 according to FIG. 2, again itself of a known aerodynamic design with fuselage 17, wings 20, engines 36 as well as rudder unit and horizontal tail unit 23, 26, has, as above, tanks (containers) 30 through 33 arranged on the fuselage 17, which are connected to the fuselage 17 by corresponding claddings to form one unit that is favorable in terms of flow. The common tank exhaust vapor line leads through the pylon 10 to the outlet device 6 in the front area of the fuselage, and the amount of exhaust vapor is split into two equal jets 14 directed symmetrically laterally to the rear, and optionally upward, flowing past the rudder unit and horizontal tail unit 23, 26.

The airplane 3 according to FIG. 3, with the fuselage 18, the wings 21, the engines 37 as well as the rudder unit and horizontal tail unit 24, 27, has as a peculiarity two slipper tanks 34 for the cryogenic fuel, which are suspended under the wings 21 and are consequently very close to the hot engine exhaust gas jets 39. The slipper tanks 34 are provided with pylons 11 and outlet devices 7, which latter release the exhaust vapor into the atmosphere in jets 15 leading laterally to the outside, away from the engine exhaust gas.

The exhaust gas jet 40 of the APU shown here is a possible source of ignition, as are the main engine jets 39, but it is avoided with certainty.

While specific embodiments of the invention have been shown and described in detail to illustrate the application of the principles of the invention, it will be understood that the invention may be embodied otherwise without departing from such principles.

What is claimed is:

1. An arrangement of a craft comprising:

a flow swept outer surface area with a craft component having a top side;

a container holding cryogenic fuels in one of a fluid form and a combustible vapor form;

an outlet device for releasing into the atmosphere cryogenic, combustible exhaust vapors in a spacial region adjacent to said flow-swept outer surface area;

a pylon connected to the craft at said top side of said component, said pylon having a top end spaced away from said craft component;

said outlet device being arranged at said top end of said pylon, said pylon being favorable in terms of flow, with said outlet device in a free, undisturbed air flow; and directed jet means provided at said outlet device for arranging, designing and orienting said outlet device such that exhaust vapor is released in at least one directed jet oriented one of to the rear and to the rear of the craft and upwardly, directed away from air inlets, directed away from sources of ignition including hot exhaust gas and directed away from surfaces of said craft, wherein the craft is an airplane having an aerodynamic design including a fuselage, wings, horizontal tail units and a rudder unit, said outlet device being arranged on a top side of the rudder unit; and another outlet device, said another outlet device being arranged on a top side of a front end of the fuselage, said another outlet device including another directed jet means for releasing vapor from said another outlet device split into two jets flowing past the rudder unit on both lateral sides of the rudder unit.

2. An arrangement in accordance with one claim 1 wherein:

said aerodynamic design includes engines and slipper tanks arranged under the wings laterally outwardly with respect to said engines;

additional outlet device is arranged at a downstream end of each said slipper tank on a top side thereof; and additional jet means is provided, said additional jet means being oriented such that the exhaust vapor released from said additional outlet device moves away from a hot engine exhaust gas jet in a jet flowing laterally outwardly from the craft.

3. An arrangement of a craft comprising:

a flow swept outer surface area with a craft component leaving a top side;

a container holding cryogenic fuels in one of a fluid form and a conmbustible vapor form;

an outlet device for releasing into the atmosphere cryogenic, combustible exhaust vapors in a spacial region adjacent to said flow-swept outer surface area;

a pylon connected to the craft at said top side of said component, said pylon having a top end spaced away from said component;

said outlet device being arranged at said top end of said pylon, said pylon being favorable in terms of flow, with said outlet device in a free, undisturbed air flow; and directed jet means provided at said outlet device for arranging, designing and orienting said outlet device such that exhaust vapor is released in at least one directed jet oriented one of to the rear and to the rear of the craft and upwardly, directed away from air inlets, directed away from sources of ignition including hot exhaust gas and directed away from surfaces of said craft wherein the craft is an airplane having a known aerodynamic design including a fuselage, engines, wings, horizontal tail units and a rudder unit and slipper tanks arranged under the wings laterally outwardly with respect to said engines, said outlet device being arranged at a downstream end of each said slipper tank on a top side thereof, said jet means being oriented such that the exhaust vapor released there moves away from a hot engine exhaust gas jet in a jet flowing laterally outwardly from the craft.

4. An arrangement of a craft comprising:

a flow swept outer surface area with a craft component having a top side;

a container holding cryogenic fuels in one of a fluid form and a combustible vapor form;

an outlet device for releasing into the atmosphere cryogenic, combustible exhaust vapors in a spacial region adjacent to said flow-swept outer surface area;

a pylon connected to the craft at said top side of said component, said pylon having a top end;

said outlet device being arranged at said top end of said pylon, said pylon being favorable in terms of flow, with said outlet device in a free, undisturbed air flow; and directed jet means provided at said outlet device for arranging, designing and orienting said outlet device such that exhaust vapor is released in at least one directed jet oriented one of to the rear and to the rear of the craft and upwardly, directed away from air inlets, sources of ignition including hot exhaust jets and directed away from surfaces of the craft, the craft being an airplane having an aerodynamic design including a fuselage, wings, engines, horizontal tail units and a rudder unit, said outlet device being arranged on a top side of said rudder unit;

slipper tanks arranged under the wings laterally outwardly with respect to said engines; and the arrangement further comprising another outlet device arranged at a downstream end of each said slipper tank on a top side thereof and another jet means provided at said another outlet device for arranging, designing and orienting said another outlet device such that the exhaust vapor released moves away from a hot engine exhaust gas jet in a jet flowing laterally outwardly from the craft.

5. An arrangement of a craft comprising:

a flow swept outer surface area with a craft component having a top side;

a container holding cryogenic fuels in one of a fluid form and a combustible vapor form;

outlet devices for releasing into the atmosphere cryogenic, combustible exhaust vapors in a spacial region adjacent to said flow swept outer surface area;

a pylon connected to the craft at said top side of said component, said pylon having a top end;

an outlet device arranged at said top end of said pylon, said pylon being favorable in terms of flow, with said outlet device in a free, undisturbed air flow; and directed jet means provided at said outlet device for arranging, designing and orienting said outlet device such that exhaust vapor is released in at least one directed jet oriented one of to the rear and to the rear of the craft and upwardly, directed away from air inlets, sources of ignition including hot exhaust jets, directed away from surfaces of the craft, the craft being an airplane having a known aerodynamic design including a fuselage, wings, horizontal tail units and a rudder unit, said outlet device being arranged on a top side of a front end of the fuselage and said jet means releases vapor from said outlet device split into two jets flowing past the rudder unit on both lateral sides of the rudder unit.

6. An arrangement in accordance with one claim 5 wherein:

said aerodynamic design includes engines and the craft includes slipper tanks arranged under the wings laterally outwardly with respect to said engines;

another outlet device is arranged at a downstream end of each said slipper tank on a top side thereof; and another jet means is provided, said another jet means being oriented such that the exhaust vapor released from said another outlet device moves away from a hot engine exhaust gas jet in a jet flowing laterally outwardly from the craft.

* * * * *